US007254374B2

(12) United States Patent
Downs

(10) Patent No.: US 7,254,374 B2

(45) Date of Patent: Aug. 7, 2007

(54) SWITCHABLE MULTI-TRANSMITTER COMBINER AND METHOD

(75) Inventor: Henry Downs, Portland, ME (US)

(73) Assignee: SPX Corporation, Charlotte, NC (US)

( * ) Notice: Subject to any disclaimer, the term of this patent is extended or adjusted under 35 U.S.C. 154(b) by 357 days.

(21) Appl. No.: 10/895,079

(22) Filed: Jul. 21, 2004

(65) Prior Publication Data

US 2006/0017521 A1 Jan. 26, 2006

(51) Int. Cl.
*H04Q 7/20* (2006.01)

(52) U.S. Cl. .......................... 455/91; 455/129; 330/53; 333/109

(58) Field of Classification Search ................ 455/103, 455/108, 127.1, 13.4, 129; 330/53, 124 R; 333/109–111
See application file for complete search history.

(56) References Cited

U.S. PATENT DOCUMENTS 4,490,684 A * 12/1984 Epsom et al. ............... 330/149
4,514,699 A * 4/1985 Kariatsumari et al. ........ 330/53
4,602,227 A * 7/1986 Clark et al. ................. 333/109
4,951,013 A * 8/1990 DeCormier et al. ........ 333/117
5,222,246 A * 6/1993 Wolkstein .................. 455/13.4
5,606,283 A * 2/1997 Allen et al. ............. 330/124 R
6,297,696 B1 * 10/2001 Abdollahian et al. ... 330/124 R
6,381,212 B1 * 4/2002 Larkin ........................ 370/210
6,614,591 B1 * 9/2003 Cooper et al. .............. 359/349
6,650,180 B2 * 11/2003 Lautzenhiser et al. .. 330/124 R
6,853,691 B1 * 2/2005 Kim ........................... 375/308
2002/0140518 A1 * 10/2002 Verghese .................... 333/126

OTHER PUBLICATIONS

HD Radio News, Steve Fluker, "For IBOC, a Better Way to Combine", Jul. 14, 2004, pp. 14-15.

* cited by examiner

*Primary Examiner*—Simon Nguyen
(74) *Attorney, Agent, or Firm*—Baker & Hostetler LLP

(57) ABSTRACT

A transmitter-combining broadcast system and method is provided that allows IBOC-compatible broadcast with simple analog-to-IBOC upgradeability with high efficiency. At full power, a standard analog signal and an IBOC-compatible digital signal are transmitted by combining the output of a wide-band transmitter containing VHF-FM analog and in-band digital signals with the output of a second transmitter containing VHF-FM analog alone. By shifting signal phase, two analog signals can be combined with low loss, and net power waste can be reduced by at least 80%. The approach enables full IBOC upgradeability for existing analog-only systems, including reuse of existing transmitting equipment. Full IBOC compliance is supported, including during operation with reduced power. Switchover between partial and full power operating modes can be performed without full system shutdown.

25 Claims, 7 Drawing Sheets

50

300

SWITCHABLE MULTI-TRANSMITTER COMBINER AND METHOD

FIELD OF THE INVENTION

This invention relates to broadcast transmitters and the transmission of audio and digital signals. More particularly, the invention presents systems and methods for combining an analog transmission signal and a digitally encoded transmission signal for broadcast on the same antenna system.

BACKGROUND OF THE INVENTION

With the advent of broadcast digital radio based on the in-band on-channel (IBOC) standard developed by iBiquity® Digital Corporation and promulgated by the Federal Communications Commission (FCC), broadcast stations previously capable of only analog transmissions are seeking cost-effective solutions to providing digital broadcasts. Conventional transmitter development has not yet yielded a cost-effective, high-efficiency solution that allows analog and digital signals to be combined and amplified using a stand-alone high power transmitter. In addition, it is understood that many broadcasters would prefer to continue to use previously acquired, operational analog transmitter systems to the extent possible, adding digital subsystems as separate—and less costly—entities. Although there are a number of previously known approaches to effect high power signal combination, these approaches have relatively high power loss, and thus incur increased operating costs. Drawbacks such as these have been deemed to make conventional methods for obtaining IBOC capability unacceptable to many in industry.

Therefore, there has been a long-standing need in the community for systems and methods that can efficiently combine digital and analog signals, and can provide a cost-effective approach to obtaining IBOC transmissions.

SUMMARY OF THE INVENTION

The foregoing needs are met, to a great extent, by the present invention, wherein in one aspect an apparatus is provided that in some embodiments provides an IBOC-compatible combined analog and digital transmitter system, which transmitter system achieves high transmission efficiency, and which transmitter system provides graceful degradation in event of system faults.

In accordance with one embodiment of the present invention, a broadcast signal combiner comprises a broadcast signal coupler having at least a first and a second input port, and at least a first and a second output port, a first phase shifter having at least an input port and an output port, wherein the first phase shifter input port is connected to the broadcast signal coupler first output port, a second phase shifter having at least an input port and an output port, wherein the second phase shifter input port is connected to the broadcast signal coupler second output port, a multiport combiner having at least a first and a second input port and at least a first and a second output port, wherein the multiport combiner first input port is connected to the first phase shifter output port, and wherein the multiport combiner second input port is connected to the second phase shifter output port, and a load coupled to the multiport combiner second output port.

In accordance with another embodiment of the present invention, a broadcast signal combiner comprises first dividing means for dividing a first input analog broadcast signal into a first, first-signal component located on a first signal-transmissive medium and a second, first-signal component located on a second signal-transmissive medium, second dividing means for dividing a second input digital broadcast signal into a first, second-signal component located on the first signal-transmissive medium and a second, second-signal component located on the second signal-transmissive medium, third dividing means for dividing a third input analog broadcast signal into a first, third-signal component located on the first signal-transmissive medium and a second, third-signal component located on the second signal-transmissive medium, first adjustable phase shifting means having a first phase shift input means that accepts input from the first signal-transmissive medium, second adjustable phase shifting means having a second phase shift input means that accepts input from the second signal-transmissive medium, paired-input combining means for combining broadcast signal components shifted in phase by the plurality of adjustable phase shifting means, and power absorbing means for absorbing power from at least one of the exit ports of the paired-input combining means.

In accordance with yet another embodiment of the present invention, a method for combining broadcast signals comprising the steps of generating a first broadcast signal having an analog component, generating a second broadcast signal having an analog component and a digital component, splitting the first broadcast signal into two generally equal parts, wherein the two parts each contain all of the signal content at generally half of the power, and wherein the two parts are in quadrature, with the first part leading the second part in phase, splitting the second broadcast signal into two generally equal parts, wherein the two parts each contain all of the signal content at generally half of the power, wherein the two parts are in quadrature, with the first part leading the second part in phase, and wherein the first part is physically collocated with the second part of the first broadcast signal to form a first set, and the second part is physically collocated with the first part of the first broadcast signal to form a second set, phase shifting at least one of the collocated sets of broadcast signal parts, combining the sets of broadcast signal parts to form a combined broadcast signal, and sending an output of the combined broadcast signal into a non-radiating load, wherein the phase of the phase shifted broadcast signals results in less than 10 percent of the analog power of the first and second broadcast signals being sent to the non-radiating load.

There have thus been outlined, rather broadly, certain embodiments of the invention in order that the detailed description thereof herein may be better understood, and in order that the present contribution to the art may be better appreciated. There are, of course, additional embodiments of the invention that will be described below and that will form the subject matter of the claims appended hereto.

In this respect, before explaining at least the embodiments of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are employed for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as such equivalent constructions do not depart from the spirit and scope of the present invention.

DETAILED DESCRIPTION OF THE PREFERRED EMBODIMENT

Figure 1:
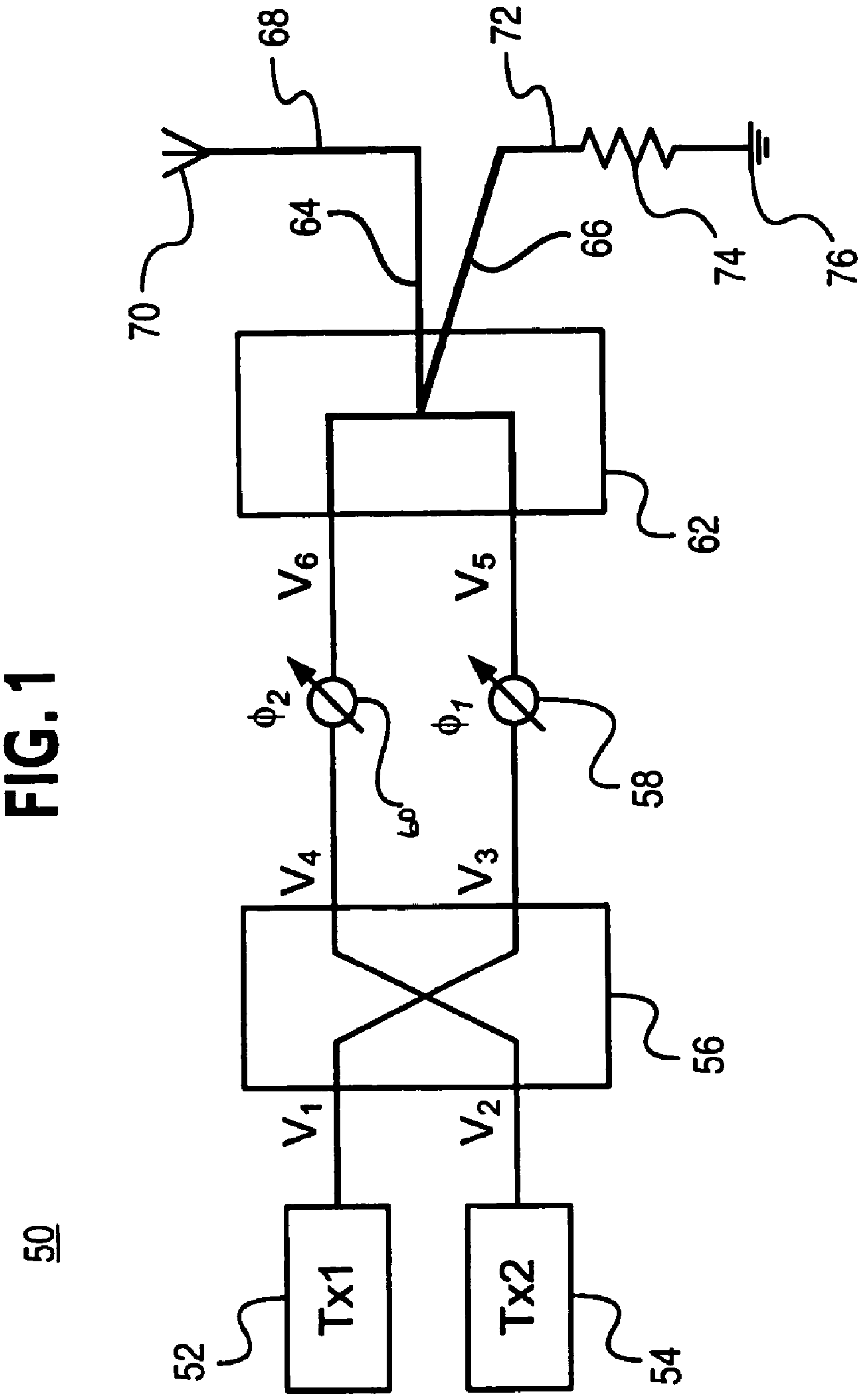
FIG. 1 is a block diagram of an embodiment of the invention.

The invention will now be described with reference to the drawing figures, in which like reference numerals refer to like parts throughout. An embodiment in accordance with the present invention enables a selective combination of conventional analog transmission with in-band, on-channel (IBOC) digital transmission to result in reduced system losses or waste. The analog and digital signals are combined in a novel way to produce transmitted signals fully compliant with regulations for an IBOC-compliant broadcasting system, as established by the Federal Communications Commission (FCC). The embodiment also permits graceful degradation of emission, avoiding a need for total transmitter shutdown in event of partial system breakdown.

In a preferred embodiment, an IBOC signal has as its primary components a standard VHF-FM broadcast audio transmission, called hereinafter an analog signal, and a digital signal transmitted using subcarriers adjacent to and associated with the same assigned channel. FCC requirements limit the digital transmission to 1% (that is, −20 dB) of the total analog emitted signal. For example, if the analog signal is forced to reduce power, such as in response to a transmitter technical problem, the power of the digital signal must also be reduced to maintain the 100:1 power ratio between the emitted analog and digital signals. This requirement serves in part to protect consumer analog signal reception in fringe areas.

Figure 2:
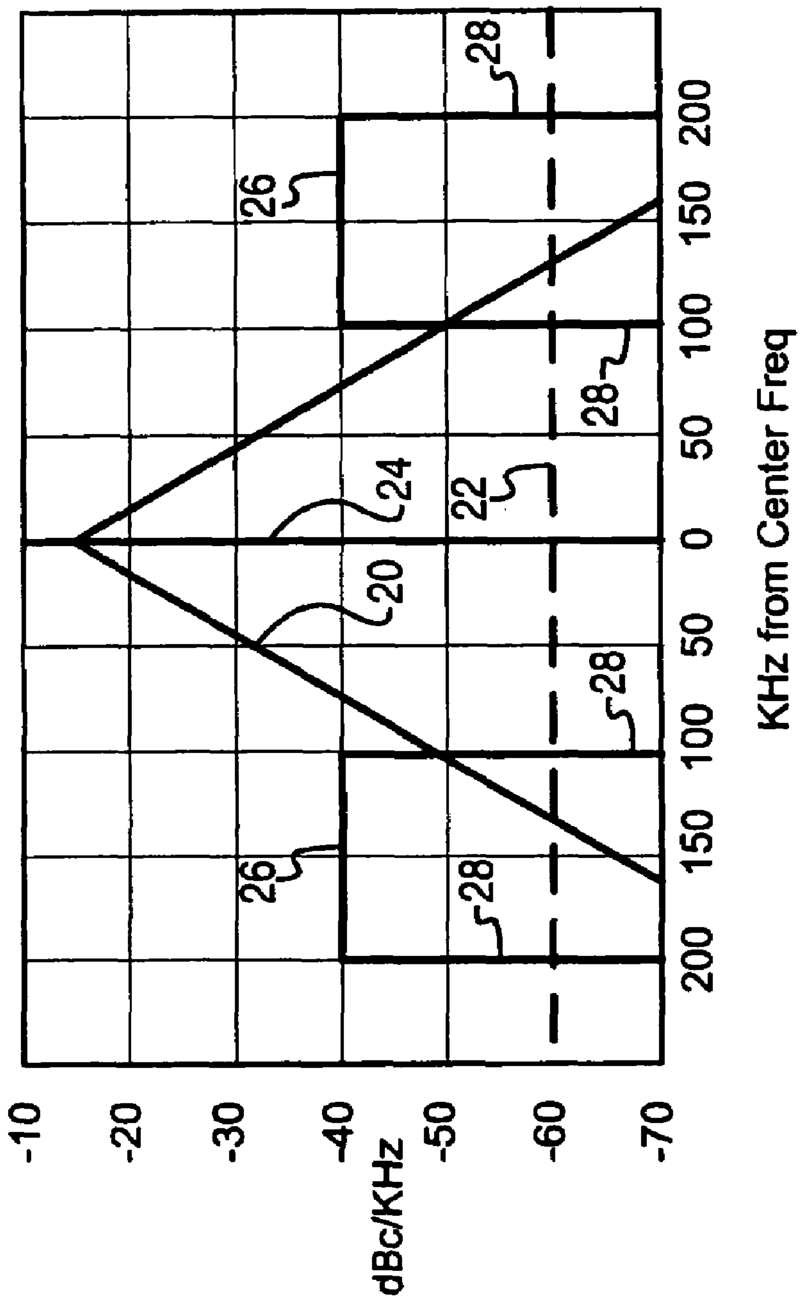
FIG. 2 is a plot of signal strength versus frequency for an IBOC signal.

As shown in the channel spectral graph of FIG. 2, the analog signal 20 of an IBOC signal is allowed to be above the noise threshold 22 over the range ±100 KHz from the center frequency 24 of the assigned channel with linear rolloff from the center frequency 24. The digital signal 26 occupies bands from −101.4 KHz to −198.4 KHz and from +101.4 KHz to +198.4 KHz with respect to the same center frequency 24 and has steep-essentially vertical-passband skirts 28. As seen in FIG. 2, the amplitude of the digital signal 26 is at least 20 db down from the peak of the analog signal 20.

Figure 3:
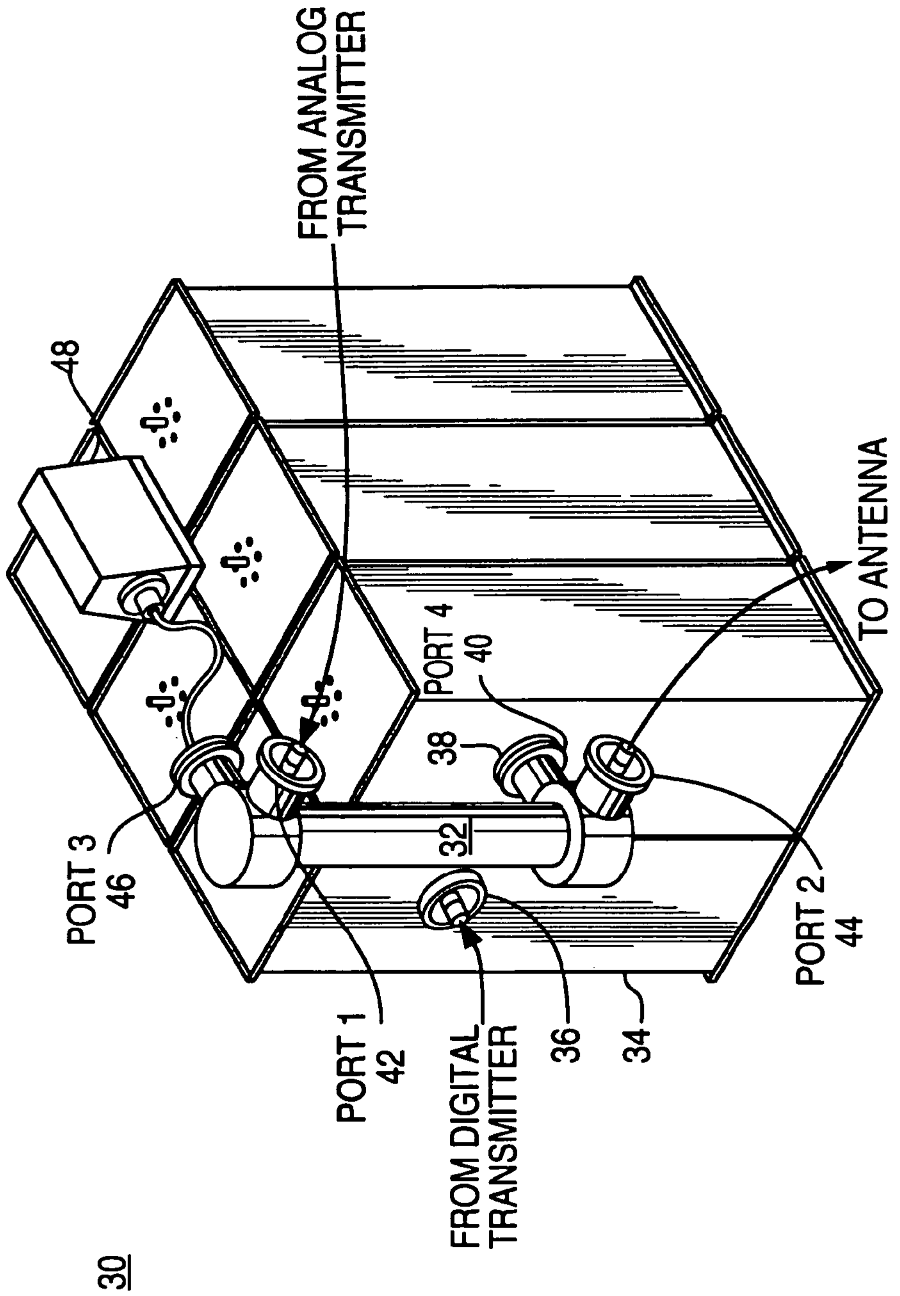
FIG. 3 (PRIOR ART)
FIG. 3 is a perspective view of a conventional combiner.

FIG. 3 is an illustration of a conventional combiner 30 that can assemble an analog signal and a digital signal for IBOC broadcast using a so-called 4-port 10 dB coupler 32. The 10 dB coupler 32 shown uses a filter 34 to block out-of-channel components of the digital signal fed in on the filter input port 36. The filter output port 38 feeds into the 10 dB coupler 32 at port 4 (40). The analog signal is fed into the 10 dB coupler 32 at port 1 (32). The internal structure of a 10 dB coupler 32 is such that 90% of the port 1 (32) analog energy is emitted at port 2 (44) and 10% of the port 1 (42) analog energy is emitted at port 3 (46), while 90% of the digital energy admitted at port 4 (40) is emitted at port 3 (46) and 10% is emitted at port 2 (44).

When a combiner system 30 as shown in FIG. 3 is used with an analog transmitter and a digital transmitter, 10% of the analog energy is dumped into a load 48, while 90% of the usually much smaller digital energy is likewise dumped into the load 48. Used with a large (30 KW or greater), single analog transmitter, this combiner 30 design results in a significant proportion of the signal power generated being discarded as waste instead of being broadcast. That is, the transmitter must not simply generate extra RF power but also then must dispose of the extra power in the form of heat dumped into the load 38. When installed as part of an IBOC upgrade to a previously all-analog system that already runs at or near a maximum practical output level, the combiner system 30 of FIG. 3 may require that the user choose between either decreasing the actual radiating analog signal strength or pushing the analog transmitter up to a less efficient, higher stress, potentially noisier operating level.

FIG. 1 is a block diagram illustrating a general operational schematic of an embodiment of the inventive apparatus 50 in which the output of a relatively low power combined analog and digital signal transmitter Tx1 (52) and the output of a relatively high power analog signal transmitter Tx2 (54) may be combined to realize the requirements for an IBOC signal, provided the digital and analog signals jointly emitted by Tx1 (52) can be adjusted to the required relative amplitudes. The waste power dissipated by an IBOC-compatible transmitter in accordance with this embodiment 50 may be appreciably reduced compared to that of the conventional design 30 shown in FIG. 3.

In operation, the transmitters Tx1 (52) and Tx2 (54) feed the two input ports of a coupler 56 having input ports $V_1$ and $V_2$ and output ports $V_3$ and $V_4$. The coupler 46 may be facilitated by the use of a 3 dB hybrid coupler 56 which is capable of equally splitting an input signal applied to one port, with a resultant 90-degree phase shift between output signals on two output ports, and of combining two input signals that differ in phase by 90 degrees to form a single output on one output port. In this embodiment, the 3 dB hybrid coupler 56 output ports $V_3$ and $V_4$ feed two phase shifters 58 and 60. The outputs of the phase shifters 58 and 60 feed the two input ports $V_5$ and $V_6$ of a combiner 62. The "main" 64 and "load" 66 ports of the combiner 62 feed, respectively, a transmission line 68 leading to an antenna 70 and a waste line 72 leading to a station load 74, which is shown connected to ground 76. The particular combiner 62 shown in this embodiment is known as a magic tee, about which more detail is presented below.

To promote better appreciation of the elegance of the apparatus 50, as illustrated in FIG. 1, a circuit analysis is provided below. Beginning with the input sources Tx1 and Tx2, where Tx1=Analog+Digital Low Power Transmitter, and Tx2=Existing Analog High Power Transmitter, and the respective voltages are $$V_{TX1}=V_A1+V_D=V1 \quad (1)$$

$$V_{Tx2}=V_A2=V2, \quad (2)$$

where $V_A n$ is the analog voltage component of Vn, emitted by transmitter Txn, $V_D$ is the digital voltage component (of V1 only, emitted by transmitter Tx1).

Working through the 3 db hybrid coupler 56 as a 3 db hybrid coupler, the $V_3$ and $V_4$ port voltages are $$V_3 = -j\frac{V1}{\sqrt{2}} + \frac{V2}{\sqrt{2}}, \quad (3)$$

$$V_4 = \frac{V1}{\sqrt{2}} - j\frac{V2}{\sqrt{2}}. \quad (4)$$

Substituting equations (1) and (2) into (3) and (4) yields $$\Rightarrow V_3 = -j\frac{(V_A1 + V_D)}{\sqrt{2}} + \frac{V_A2}{\sqrt{2}}, \quad (5)$$

$$V_4 = \frac{V_A1 + V_D}{\sqrt{2}} - j\frac{V_A2}{\sqrt{2}}, \quad (6)$$

$$\Rightarrow V_3 = \frac{V_A2 - jV_A1}{\sqrt{2}} - j\frac{V_D}{\sqrt{2}}, \text{ and} \quad (7)$$

$$V_4 = \frac{V_A1 - jV_A2}{\sqrt{2}} + \frac{V_D}{\sqrt{2}}. \quad (8)$$

Assume that $V_A$1 and $V_A$2 are adjusted to be in phase at their respective inputs to the 3 dB hybrid coupler 56. When the amplitudes of $V_A$1 and $V_A$2 differ, the resultant phase of the VA component in $V_3$ and $V_4$ will be different. Let us assume for this example a power ratio of 4:1, equivalent to a voltage ratio of 2:1. Then $$V_A\mathbf{1} = 0.5V_A\mathbf{2}. \quad (9)$$

Substituting this in equations (7) and (8) above yields $$V_3 = \frac{(V_A2 - 0.5jV_A2)}{\sqrt{2}} - j\frac{V_D}{\sqrt{2}}, \text{ and} \quad (10)$$

$$V_3 = \frac{(0.5V_A2 - jV_A2)}{\sqrt{2}} + \frac{V_D}{\sqrt{2}}. \quad (11)$$

In terms of phase angles, equations (10) and (11) can be expressed as, $$\Rightarrow V_3 = \frac{1.118V_A}{\sqrt{2}}\angle -26.56° + \frac{V_D}{\sqrt{2}}\angle -90°, \text{ and} \quad (12)$$

$$V_4 = \frac{1.118V_A}{\sqrt{2}}\angle -63.43° + \frac{V_D}{\sqrt{2}}\angle 0°. \quad (13)$$

Next, by adjusting phase $\phi_1$, of first place shifter 48 and phase $\phi_2$ of second phase shifter 50 so that $$\phi_1 = -36.87°, \text{ and} \quad (14)$$

$$\phi_2 = 0° \quad (15)$$

then the input voltages $V_5$ and $V_6$ at the combiner 62 will be $$\Rightarrow V_5 = \frac{1.118V_A}{\sqrt{2}}\angle -63.43° + \frac{V_D}{\sqrt{2}}\angle -126.87° \quad (16)$$

$$V_6 = \frac{1.118V_A}{\sqrt{2}}\angle -63.43° + \frac{V_D}{\sqrt{2}}\angle 0° \quad (17)$$

Thus, the analog signal components $V_5$ and $V_6$ entering the two legs of the 3 dB combiner 62 are in phase and have equal magnitude. Calculating the total analog output $V_{A\ OUT}$ results in, $$V_{A OUT} = \frac{1}{\sqrt{2}}V_{5A} + \frac{1}{\sqrt{2}}V_{6A}, \text{ or} \quad (18)$$

$$= 1.118V_A\angle -63.43°. \quad (19)$$

With a power ratio of 4:1 as originally specified, $$\Rightarrow P_{A\ OUT} = 1.25\ P_{A\ IN},$$

where $P_{A\ OUT}$ is the total analog power out of the system and $P_{A\ IN}$ is in the analog power furnished from Tx2, the existing high-power analog transmitter.

Thus, with a 3 dB combiner 62 fed by two equal magnitude, in-phase signals, all of the analog power goes to the antenna path 68.

Consider now the digital signal. The two signals at the inputs to the 3 dB hybrid coupler 62 are equal in magnitude, but are out of phase by 126.87°—that is, 90° from the 3 dB hybrid coupler 46 plus the 36.87° from the phase shifter 48.

As above, the phase $\phi_1$ and $\phi_2$ of the phase shifters 58 and 60 are set so that $$\phi_1 = -36.87°, \quad (22)$$

$$\phi_2 = 0°. \quad (23)$$

Accordingly, the input voltages V5 and V6 will be $$\Rightarrow V_{5D} = \frac{V_D}{\sqrt{2}}\angle -126.87°, \text{ and} \quad (24)$$

$$V_{6D} = \frac{V_D}{\sqrt{2}}\angle 0°. \quad (25)$$

The digital component appearing at the sum port 64 of the combiner 62, $V_{D\ OUT}$, is directed to the antenna path 68, and may be computed as $$V_{D OUT} = \frac{1}{2}V_{5D} + \frac{1}{\sqrt{2}}V_{6D}, \text{ or} \quad (26)$$

$$= \frac{V_D}{2}\angle -126.87° + \frac{V_D}{2}\angle 0°, \quad (27)$$

which resolves to, $$V_{D\ OUT} = 0.447\ V_D < -63.43°. \quad (28)$$

In terms of power, this translates to the relationship $$P_{D\ OUT} = 0.2\ P_{D\ IN}, \quad (29)$$

where $P_{D\ OUT}$ is the total digital power output from the system, and $P_{D\ IN}$ is the digital power from the Tx1 combined analog/digital transmitter 52.

The $V_{LOAD}$ signal emitted from the difference port 66 of the 3 dB hybrid is directed to the station load. This value may be computed as $$V_{LOAD} = \frac{1}{\sqrt{2}} V_5 - \frac{1}{\sqrt{2}} V_6, \text{ or} \tag{30}$$

$$\Rightarrow \quad = \frac{1}{\sqrt{2}}\left(\frac{V_D}{\sqrt{2}}\angle -126.87° - \frac{V_D}{\sqrt{2}}\angle 0°\right), \tag{31}$$

$$= \frac{V_D}{2}\angle -126.87° - \frac{V_D}{2}\angle 0°, \tag{32}$$

which resolves to, $$V_{LOAD}=0.894 V_D < -26.55 \tag{33}$$

In terms of power, $$P_{LOAD}=0.8\ P_{D\ IN}, \tag{34}$$

where $P_{LOAD}$ is the power transmitted to the station load.

The as-broadcast digital power level is required under the IBOC specification to be no greater than −20 dB with respect to the as-broadcast analog power level. In the example given, the digital power at the output is −20 dB with respect to $P_{A\ TOTAL}$, where $P_{A\ TOTAL}$ is five times the analog out of Tx1, the combined analog/digital transmitter 52. Thus, $$P_{D\ OUT}=0.05\ P_{Tx1}. \tag{35}$$

This is 20% of the total digital power output from the analog/digital transmitter 52. This means that the digital level of the analog/digital transmitter cannot exceed 0.25 $P_{Tx1}$.

As a practical example, if the total analog output power for a broadcast signal were to be 35 KW, the high power analog transmitter 54 could be throttled back to an operating power of 28 KW, the analog level of the analog/digital transmitter 52 could be set at 7 KW, and the digital level of the analog/digital transmitter 52 would need to be set at 1.75 KW. This combination, under the configuration illustrated in FIG. 1, would yield the desired analog output of 35 KW with negligible analog power dumped into the station load 74, while a digital signal of 350 W would be directed to the antenna 70 while 1.4 KW of the digital signal would be dissipated in the station load 74.

It should be particularly noted that other configurations and power levels are possible. The two analog transmitters 52 and 54 need not be in the ratio 4:1, for example, but all of the computations and phase shifter 58 and 60 settings would need to be adjusted in order to use transmitters in the ratio 3:1, 5:1, etc. The 35 KW existing-transmitter example is chosen in part because it is applicable to a significant number of real-world transmitters that are already operating at or near the maximum emission level allowed under FCC regulations.

The above design yields significantly superior performance and enhanced efficiency in comparison to the conventional combiner 30 of FIG. 3, wherein 10% of the analog input and 90% of the digital input are dumped into the load 48. For the equivalent output power levels to be achieved in a conventional combiner 30, it would be necessary to have an analog transmitter operating output power of 38.89 KW and a digital operating output power of 3.5 KW. The power dumped in the station load 48 would be 3.89 KW from the analog and 3.15 KW from the digital, a total in excess of 7 KW compared to the 1.4 KW of the preferred embodiment. Thus, the present invention is capable of reducing the direct power loss by 80% over that of conventional systems.

A typical device type for the combiner 62 in the embodiment 50 may be the magic tee combiner. Magic tees for various frequency regimes may be implemented in coax, in strip line, in waveguide, in lumped components, or in any other technology compatible with the wavelength and power level involved, and thus may have a variety of physical forms. A typical magic tee may have a first output port 64 as the primary output, which would typically be directed to a broadcast antenna, and a secondary output port 66 commonly used for discarding waste energy under a variety of circumstances. For example, if it is desired to operate one of the transmitters 52 or 54 in the embodiment without broadcasting, which might be desirable during testing, for example, then adjustment of the first and second phase shifters 58 and 60 can allow substantially all of the transmitter energy from the powered-up transmitter to be directed to a dummy load 74—commonly known as a station load-attached to the combiner secondary output port 66. Observe that the power capacity of the secondary port 66 is the same as that of the primary port 64 for a typical magic tee combiner 62, with the geometry of the magic tee 62 determining which of the ports 64 and 66 serves as the primary for physical layout of a given transmitter system 50.

In a magic tee 62, relative signal phase and magnitude of the inputs $V_5$ and $V_6$ to the two input ports determines how much signal is emitted from each of the output ports 64 and 66. For example, if the two magic tee 62 inputs have the same signal waveform, power level, and phase, then the primary output port 56 can emit virtually 100% of the combined signal energy. If the signal applied to the second input port lags by 180 degrees but is otherwise identical, then virtually 100% of the energy appears at the secondary output port 66.

Figure 4:
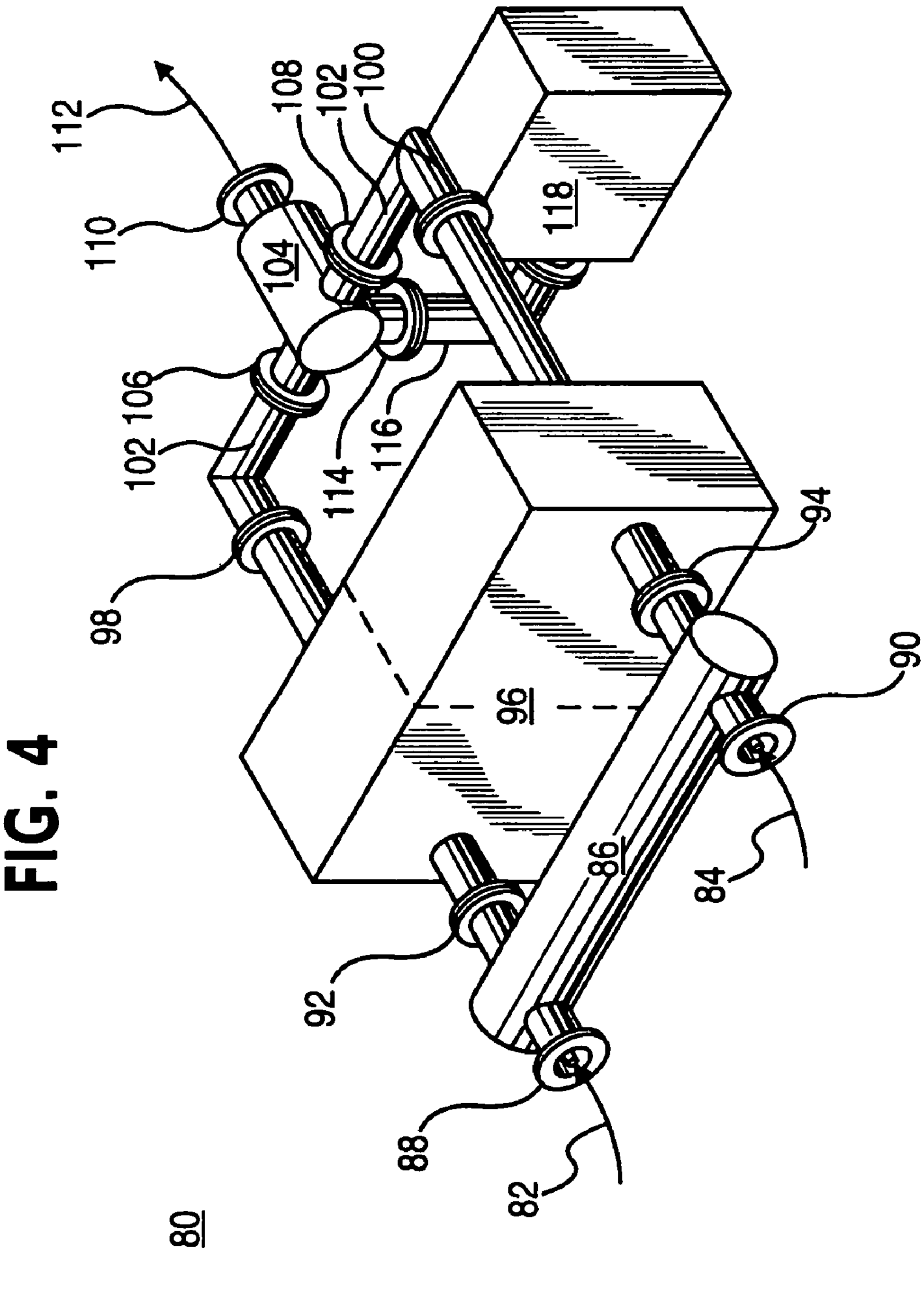
FIG. 4 is a perspective view of a system configuration of an embodiment of the invention.

FIG. 4 is illustrative of a combiner 80, according to this invention. The combiner 80, a 3 dB hybrid coupler 86 with two input ports 88 and 90, has a low power combined analog/digital input 82 and a high-power analog input 84. The 3 dB hybrid coupler 86 has output ports 92 and 94 coupled to a phase shifter 96. The phase shifter 96 may be a duplexed phase shifter, having identical, isolated phase shifters therein.

For example, a commercial apparatus, whether in the form of a single unit, two separate units, multiple units, or a pair mounted in a single housing 96 for thermal tracking and other benefits, typically requires mechanisms for making physical adjustments to the positions of internal elements. These mechanisms may in turn require external fittings such as motor drives, electrical connectors for power and control, measurement terminals, and the like, as well as mounting brackets, flange bolt holes, and other details that may be generally known in the art and adapted to the specific embodiment under consideration.

It may be further observed that alternative phase shifter 96 embodiments may employ phase shift realizations which require no external or internal physical dimension changes, but instead perform phase shift using changes in physical properties of the components, or which use other technologies to realize phase shift. Such devices 104 as ferrite slabs to which variable electromagnetic fields are applied, for example, can be used to perform variable phase shift of RF signals without macro level physical dimension changes.

Thus, any device capable of performing a phase shift may be suitable in some applications.

It may be further observed that the phase delay settings realized by the phase shifter apparatus 96 in the two signal paths may be independently adjustable settings. In other embodiments, however, it may be useful for the phase shifters to be able to be coupled, for example to allow a single actuation to shift the two delays oppositely where appropriate.

The output ports 98 and 100 of the phase shifter 96 feed via coax plumbing 102 into a four port 3 dB combiner 104, the ports 106 and 108 of which may in some embodiments be physically and electrically symmetrical. In this embodiment 80, the 3 dB combiner 104 is a magic tee, also known as a 3 dB 180 degree coupler, in which the output ports are separated in phase by 180 degrees, unlike the 3 dB hybrid coupler 86, also known as a 3 dB quadrature coupler, in which the outputs are separated in phase by 90 degrees. However, any device capable of performing a combining function, irrespective of phase shift amount, and irrespective of whether or not the device divides an incoming signal into two generally equal parts as does a 3 dB hybrid, may be suitable in some applications.

Input signals 82 and 84 are processed in the 3 dB hybrid coupler 86 and phase shifter 96 to yield equal-magnitude, in-phase analog components at the combiner 104 inputs 106 and 108. The "main" output port 110 of the combiner 104 emits an in-phase analog signal 112 originally applied as a low power combined analog/digital signal input 82 and high power analog signal input 84. The "main" output port 110 also emits a portion of the digital component of the analog/digital input signal 82. The "load" output port 114 emits the remainder of the digital component of the analog/digital input signal 82. The remainder of the digital component is fed via more coax plumbing 116 into the station load 118, so called because it will in many embodiments carry the full power of a radio station at some times. A typical station load 118 may be expected to have forced air and cooling fins and/or chilled liquid coolant and/or another heat removal system (not shown) to remove heat during extended full-power operation.

Figure 5:
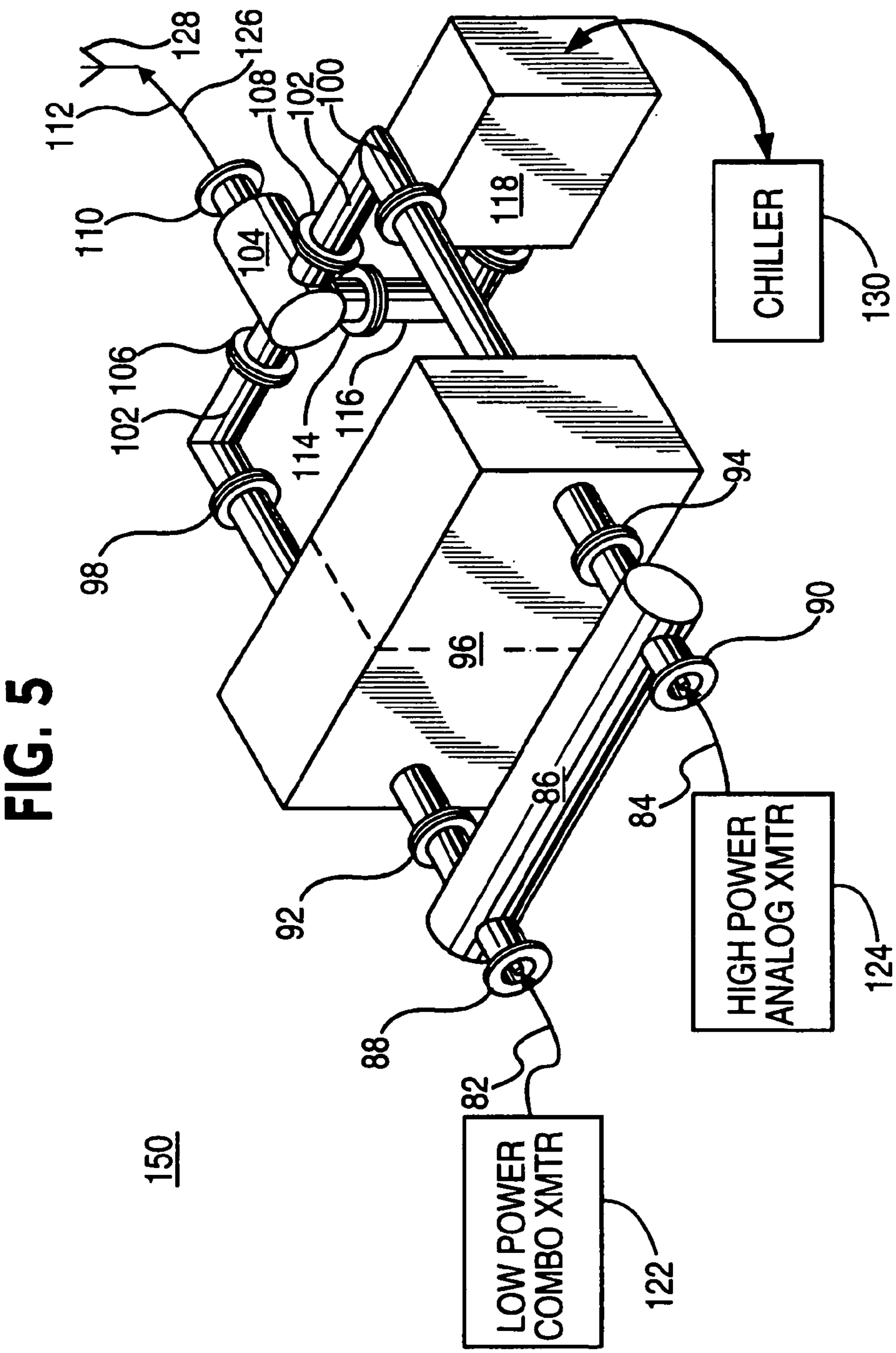
FIG. 5 is a perspective view of an embodiment of the invention.

FIG. 5 is an illustration of the exemplary embodiment 80 of FIG. 4 as part of an integrated system 150. Here, the (low power) combined analog/digital transmitter 122 and the (high-power) analog transmitter 124 feed into the exemplary embodiment 80, which in turn feeds the combined output via a transmission line 126 to an antenna 128, while heat removal is realized using a chiller 130.

Figure 6:
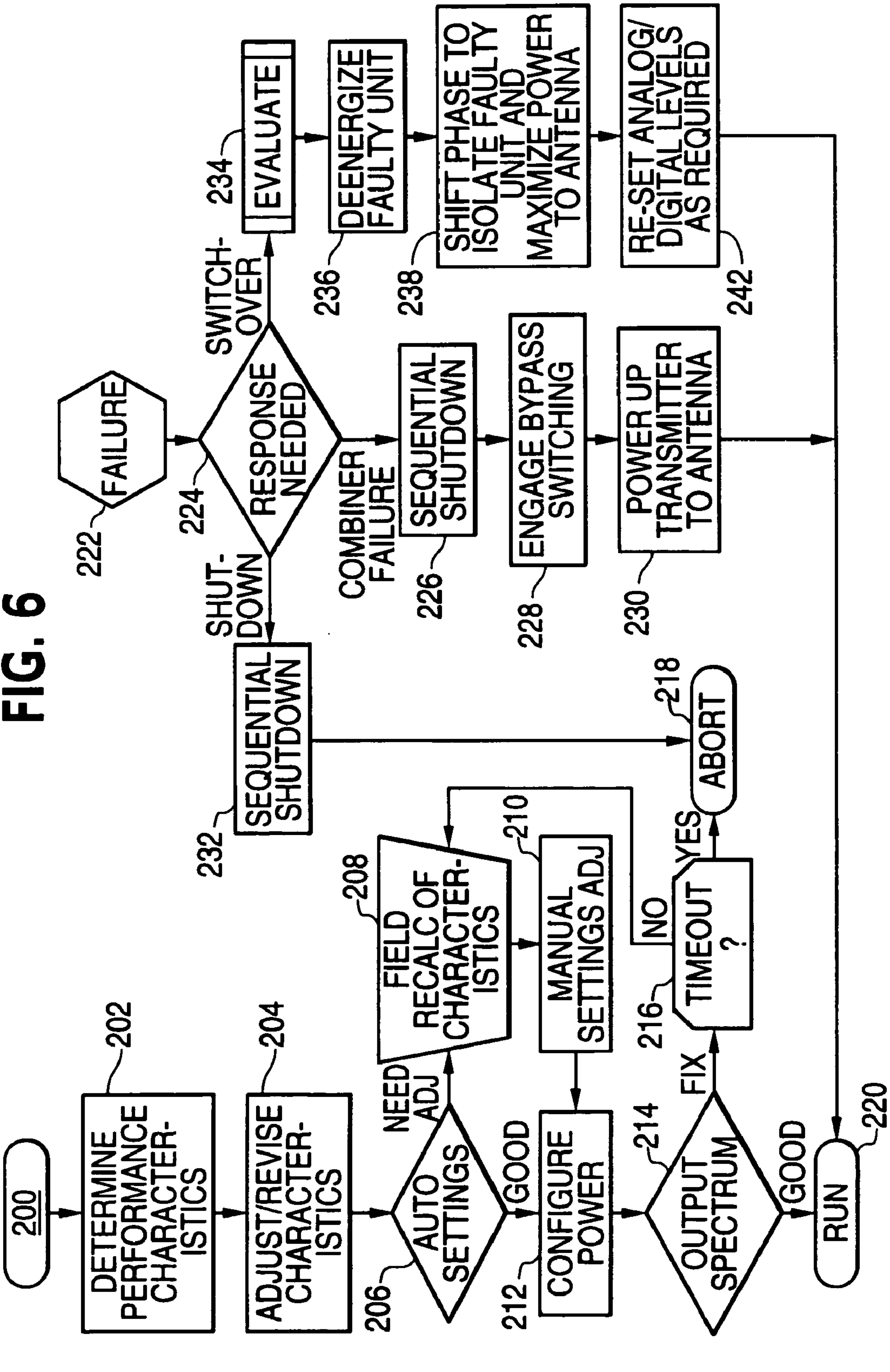
FIG. 6 is a flowchart illustrating setup of a system according to an embodiment of the invention.

FIG. 6 is a flow chart of exemplary processes according to this invention, wherein the various operational modes, for example, as shown are selected. Starting with an uncalibrated system, for example, the process of FIG. 6 adjusts the properties of adjustable elements in an exemplary system to optimize signal output to an antenna and minimize waste power dissipated into a station load.

Beginning with Step 200, the process is initialized. Next, Step 202 determines desired performance characteristics, such as allowed radiated power level, apparatus maximum and desired power output settings, known fault conditions, antenna gain, and correlation between adjustment settings and performance, for example. Step 204 proceeds with adjustment/revision of desired characteristics if needed. Step 206 compares settings for which feedback is available to desired settings. If Step 206 determines that a setting needs adjustment, then Step 208 is invoked. Step 208 calls for recalculation of characteristics where results of initial adjustment have been found unsatisfactory. Manual adjustment of settings, Step 210, may be necessary to accommodate the error terms. Step 212 calls for application of power, which may involve setting levels and verifying signal delays through various paths. A review of the system operating performance, Step 214, may include verification of signal purity and the power ratio of digital to analog. If faulty, the signal may be revised by further recalculation and adjustment, although a system fault may lead to timing out, Step 216, in even a manual system. The result of falling through step 210 is to abort the procedure, Step 218, and invoke troubleshooting.

If Step 214 does not encounter a timeout, then Step 214 forwards control to Step 220, which is a normal run condition. A system may ordinarily remain in the normal run condition of Step 220 indefinitely.

Departure from the run condition of Step 220 is normally accomplished by interrupting the system function with an external stimulus. This is shown in Step 222 as a failure event that calls for analysis. The failure event in Step 222 invokes a determination whether the system should be fully deenergized, or should have the configuration adapted to changed conditions. Step 222 thus leads to deciding on the response needed, Step 224. A first option is sequential lowering of signal level, amplifier voltages, and heat exchanger (chiller) flow, Step 232, until the system is completely deenergized. If a combiner has failed, Step 226 may require a similar sequential shutdown 226, followed by mechanical rerouting of signals using bypass switching not necessarily integral to the inventive apparatus, Step 228, and reapplication of power to the antenna, Step 230, which leads to running, Step 220, although in a possibly nonstandard configuration. If partial operation or redundant transmitter systems can be engaged, then Step 224 may initiate switchover, in which case evaluation, Step 234, may lead to deenergization of a faulty unit 236, adjustment of phase shift on the phase shifters 86, verification and adjustment of settings, Step 242, and resumption of running, Step 220. In this last case, switchover may be accomplished without powering down the entire system, a potentially beneficial alternative.

Variations of the operational modes and phases of the respective components of the exemplary embodiments of this invention are further discussed in Table 1, below.

TABLE 1

Phase Shifter Settings for Several Configurations

| 40 KW Analog Transmitter | 10 KW Analog/Digital Transmitter | $Ø_1$ Phase | $Ø_2$ Phase | Antenna | Station Load |
|---|---|---|---|---|---|
| ON | Analog ON, Digital ON | 36.87° | 0° | Analog & −20 dB Digital | Digital Excess |
| ON | Analog ON, | 36.87° | 0° | Analog | N/A |

TABLE 1-continued

Phase Shifter Settings for Several Configurations

| 40 KW Analog Transmitter | 10 KW Analog/Digital Transmitter | Ø1 Phase | Ø2 Phase | Antenna | Station Load |
|---|---|---|---|---|---|
| ON | Digital OFF Analog OFF, Digital 3.85 KW | 53.25° | 0° | 38.9 KW Analog & 350 W Digital | 3.9 KW Analog & 3.5 KW Digital |
| ON | OFF | 90° | 0° | Analog | 0% |
| ON | OFF | 0° | 90° | N/A | Analog |
| OFF | Analog 10 KW, Digital 100 W | 0° | 90° | Low power Analog & IBOC | N/A |
| OFF | Analog 10 KW, Digital 100 W | 90° | 0° | N/A | Low Power Analog & IBOC |

Assuming that the power levels in the numerical example above are used, then specific phase angles may be approximately those shown in Table 1. It is evident that transmitters in the power ratio 4:1 may be a special case, so that the example given may be seen as serving for demonstrative purposes, and, therefore, that the exemplary systems and processes herein should not be seen as limiting.

Referring to FIG. 6 for Step 238, if the faulty unit is identified as the analog transmitter, for example, (124 in FIG. 5), then digital power must be reduced, as part of the procedure invoked in Step 240, along with adjusting the phase shifters 96, Step 242, to maintain the IBOC power ratio. For example, with a 10 KW analog/digital transmitter run at full power, a new phase angle of 0 degrees for $\phi_1$, and 90 degrees for $\phi_2$, and a new digital power output of 100 W result in no power being directed to the station load 118 as long as the analog transmitter 124 is off. With the power level lowered by some 75 percent, however, performance may be expected to be significantly degraded.

If the faulty signal is the analog component from the analog/digital transmitter (for example, 122 in FIG. 5), and the analog transmitter has a maximum output of 38.89 KW (duplicating the conventional combiner example above), then a range of settings can provide an IBOC ratio, such as 53.25 degrees for $\phi_1$ and 0 degrees for $\phi_2$ yielding analog signal power output of 35 KW and digital signal power output of 350 W, with 3.89 KW from the analog transmitter and 3.5 KW from the digital transmitter dumped into the station load 118.

If the faulty unit is the digital component of the analog/digital transmitter (for example, 122 in FIG. 5), then removing power from the analog component of the analog/digital transmitter 122, as well, and setting phase angles of 0 degrees for $\phi_1$ and 90 degrees for $\phi_2$ to direct the analog transmitter 124 signal alone to the antenna 128, may be used to allow analog broadcasting while the digital signal is unavailable.

Testing of the digital signal with the analog component of the analog/digital transmitter shut down can also have phase angles of 0 degrees for $\phi_1$ and 90 degrees for $\phi_2$, which allows the entire digital signal to be directed to the station load 118 while the analog transmitter operates at full power.

It may be observed that, for the above examples, the user was not compelled to power down the station in order to perform the indicated reconfigurations for repair or test, but could instead adjust the phase shifters (for example, 58 and 60 of FIG. 1) and adjust transmitter output levels to reconfigure. It is to be understood that gross disassembly of high-power apparatus may be performed with power removed, and that, for some test configurations, no broadcast may be possible. The embodiment allows reduced signal output to be established in some operating modes by redirecting some transmitter power to the station load 118, by "throttling back" (decreasing the plate voltage on, reducing the input signal level applied to, etc.) the transmitters, or by shutting down individual transmitters 122 and 124, provided in each case that the phase delay apparatus 96 is set appropriately.

Figure 7:
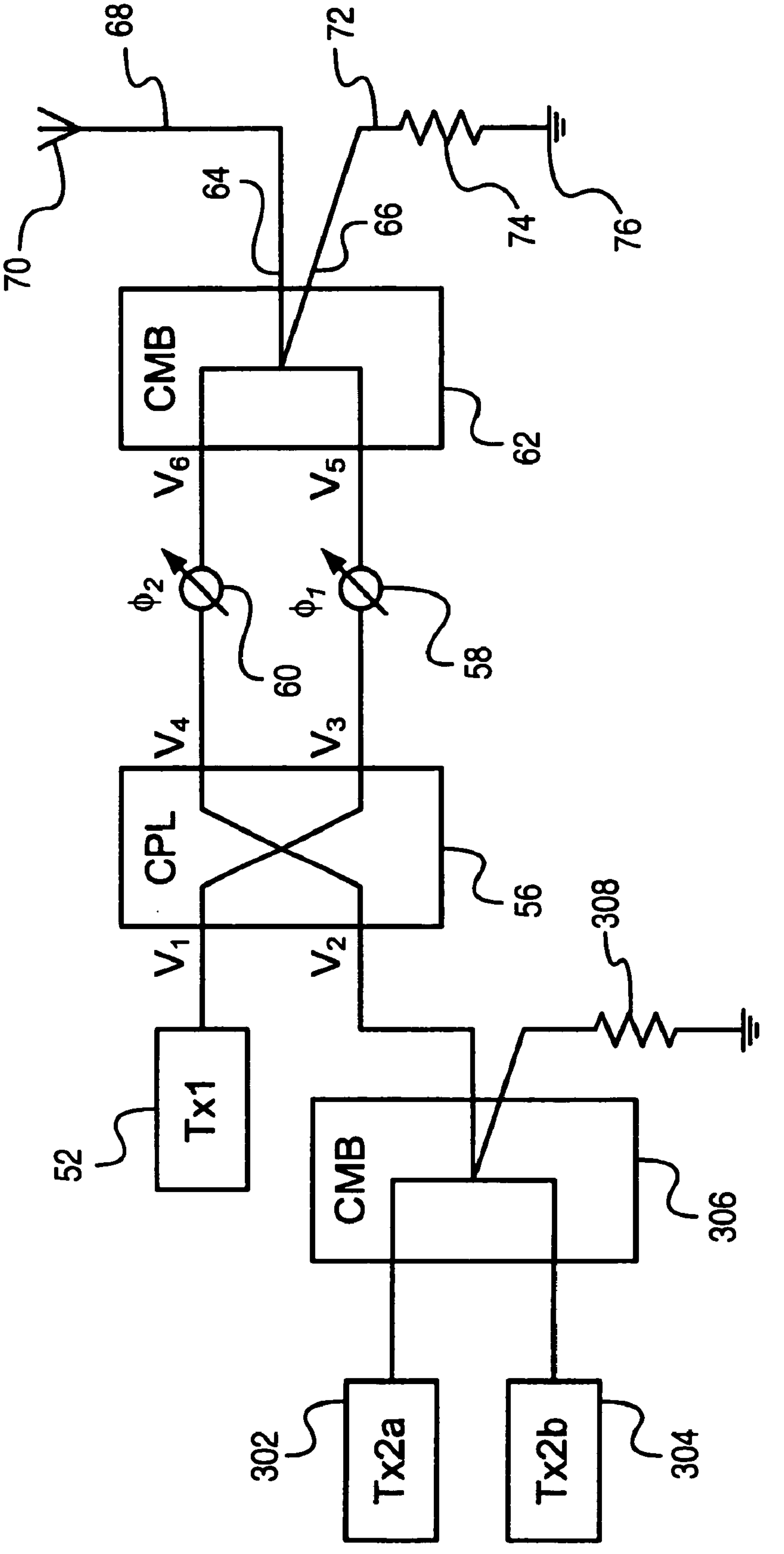
FIG. 7 is a block diagram of an alternative embodiment of the invention.

Alternative embodiments may be suited to some applications. FIG. 7 is an illustration of such a configuration 300, in which, for example, a radio station may have a high power output achieved using, as a simple example, two medium-power analog transmitters 302 and 304 with a combiner 306. A station may be able to run on reduced power by "throttling back" one or both of the transmitters 302 and 304 and adjusting the phase of the low-level input signals into the transmitters 302 and 304 to compensate for any residual amplitude difference between the transmitters. The two analog transmitters 302 and 304 may in some embodiments have equal power output capability. If the combiner 306 and dummy load 308 are replaced by a configuration with a combiner of the type illustrated in any of FIGS. 1 and 4-5, then the two analog transmitters 302 and 304 may be unequal yet operate with acceptable or negligible power wastage.

Addition of IBOC capability to a system of the configuration of FIG. 7 may be realized by placement of the embodiment of FIG. 4, including a low-power solid-state analog/digital transmitter 52, in parallel with the combined analog transmitter pair 302 and 304 as shown. An equivalent result may be realized by combining the signal of one of the analog transmitters 302 with the signal of the analog/digital transmitter using the embodiment of FIG. 4, then combining that output with the output of the second analog transmitter 304. In both of these embodiments, adjustment of respective phase shifters to achieve various operating modes may need to be determined by the relative amplitudes of the signals applied to each coupler or combiner. Additional phase shifters, couplers, and combiners may be needed in specific applications. The cost and space penalties of such devices may be outweighed in many applications by reduction in recurring power generation and heat removal costs, improved signal purity and extended transmitter life thanks to operating transmitters at reduced output, and other considerations.

The embodiments discussed herein demonstrate configurations which incorporate IBOC capability into either a new radio station or a preexisting analog-transmitter station. Still other embodiments are possible, which can adapt the systems and methods presented herein to specific combinations of preexisting analog equipment, issues of physical space constraints at a transmitter site, cost tradeoffs that may dictate a scalable sequential buildup, and the expected time until decommissioning of individual units of equipment already in operation.

Although an example of the switchable IBOC combiner is shown using the VHF-FM radio band, it will be appreciated that the high frequency, amplitude modulated (HF-AM) broadcast band assigned at 535 KHz-1.605 MHz is recognized under the same FCC regulations for IBOC broadcasting. Further, it will be appreciated that the transmission line phase shift technology employed need not rely solely on reactive elements such as slots, bulges, open and shorted stubs, and the like embedded within coaxial transmission lines, but may employ lumped impedance elements such as capacitors, inductors, transformers, and resistors instead of or in addition to distributed elements. Similarly, although an application for the described apparatus and method is IBOC broadcasting, it will be appreciated that the apparatus and method may be suitable for applications other than HF and VHF radio broadcasting. Also, although coaxial line may be a useful material to form the functional units in VHF-FM IBOC according to the embodiment described herein, alternative transmission lines such as microstrips, striplines, open wire lines, waveguides, etc. can also function as combiners, 3 dB hybrid couplers, filters, and the like for applications in lower power or higher frequency domains, as well as for applications where very large size is not a drawback.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A broadcast signal combiner, comprising:

a first transmitter having an output port, wherein said first transmitter is configured to output a broadcast-compatible first analog signal, to operate on a specified channel, and to have a first power level;

a second transmitter having an output port, wherein said second transmitter is configured to output a broadcast-compatible second analog signal on the specified channel and substantially synchronous with the first analog signal, having a second power level, and simultaneously output a broadcast-compatible digital signal having a third power level and conforming to In-Band On-Channel signal requirements that operates on the specified channel;

a broadcast signal coupler having at least a first and a second input port, and at least a first and a second output port, wherein said first coupler input port is in communication with said first transmitter output port, and said second coupler input port is in communication with said second transmitter output port;

a first phase shifter having at least an input port and an output port, wherein said first phase shifter input port is in communication with said broadcast signal coupler first output port;

a second phase shifter having at least an input port and an output port, wherein said second phase shifter input port is in communication with said broadcast signal coupler second output port;

a multiport combiner having at least a first and a second input port and at least a first and a second output port, wherein said multiport combiner first input port is in communication with said first phase shifter output port, and wherein said multiport combiner second input port is in communication with said second phase shifter output port; and a load coupled to said multiport combiner second output port.

2. The broadcast signal combiner of claim 1, wherein said coupler comprises a hybrid coupler.

3. The broadcast signal combiner of claim 2, wherein said hybrid coupler comprises a 3 dB quadrature coupler.

4. The broadcast signal combiner of claim 1, wherein said multiport combiner comprises a magic tee combiner.

5. The broadcast signal combiner of claim 1, wherein said load comprises a non-radiating load.

6. The broadcast signal combiner of claim 5, wherein said first and second phase shifters permit configuration so that less than 10 percent of the combined analog power of all of the signals directed into said first and second input ports of said coupler exits said multiport combiner into said non-radiating load.

7. The broadcast signal combiner of claim 1, further comprising an antenna coupled to said multiport combiner first output port.

8. The broadcast signal combiner of claim 7, wherein said first and second phase shifters are configured so that greater than 90 percent of the combined analog power of all of the signals directed into said first and second input ports of said coupler exits said multiport combiner into said antenna.

9. The broadcast signal combiner of claim 1, wherein said phase shifters are adjustable.

10. The broadcast signal combiner of claim 1, wherein said phase shifters are adjustable independently of each other.

11. The broadcast signal combiner of claim 1, wherein said first transmitter further comprises a plurality of analog signal transmitters.

12. The broadcast signal combiner of claim 1, wherein the first and second transmitters are capable of transmitting very high frequency (VHF) signals.

13. The broadcast signal combiner of claim 12, wherein said first transmitter and said second transmitter are capable of transmitting analog signals using frequency modulation (FM).

14. The broadcast signal combiner of claim 1, wherein the first and second transmitters are capable of transmitting high frequency (HF) signals.

15. The broadcast signal combiner of claim 14, wherein said first transmitter and said second transmitter are capable of transmitting analog signals using amplitude modulation (AM).

16. A method for combining broadcast signals, comprising generating a first broadcast signal having an analog component;

generating a second broadcast signal having an analog component and a digital component;

splitting the first broadcast signal into two generally equal parts, wherein the two parts each contain all of the signal content at generally half of the power, and wherein the two parts are in quadrature, with the first part leading the second part in phase;

splitting the second broadcast signal into two generally equal parts, wherein the two parts each contain all of the signal content at generally half of the power, wherein the two parts are in quadrature, with the first part leading the second part in phase, and wherein the first part is physically collocated with the second part of the first broadcast signal to form a first set, and the second part is physically collocated with the first part of the first broadcast signal to form a second set;

phase shifting at least one of the collocated sets of broadcast signal parts;

combining the sets of broadcast signal parts to form a combined broadcast signal; and sending an output of the combined broadcast signal into a non-radiating load, wherein the phase of the phase shifted broadcast signals results in less than 10 percent of the analog power of the first and second broadcast signals being sent to the non-radiating load.

17. The method of claim 16, further comprising:

sending an output of the combined broadcast signal into an antenna, wherein the phase of the phase shifted broadcast signals results in greater than 10 percent of the digital power of the first and second broadcast signals being sent to the antenna.

18. The method of claim 16, wherein the first broadcast signal is generated as an analog VHF-FM signal.

19. The method of claim 16, wherein the second broadcast signal is generated as a plurality of independent signals, a first one of which is an analog VHF-FM signal and a second one of which is a digital VHF signal.

20. The method of claim 19, wherein the second broadcast signal is generated as an IBOC signal.

21. The method of claim 19, wherein the first broadcast signal and the second broadcast signal are in a same channel.

22. The method of claim 16, wherein the first broadcast signal is generated from a plurality of transmitters.

23. The method of claim 16, wherein the step of splitting the broadcast signals is performed with a first 3 dB hybrid coupler.

24. The method of claim 16, wherein the step of combining the broadcast signals is performed with a magic tee combiner.

25. The method of claim 16, wherein the step of combining the broadcast signals is performed with a second 3 dB hybrid coupler.

* * * * *